US008671998B2

(12) United States Patent
Lohmann

(10) Patent No.: US 8,671,998 B2
(45) Date of Patent: Mar. 18, 2014

(54) APPARATUS AND METHOD FOR TESTING AN AIRCRAFT TANK SYSTEM

(75) Inventor: Jürgen Lohmann, Hamburg (DE)

(73) Assignee: Airbus Operations GmbH (DE)

( * ) Notice: Subject to any disclaimer, the term of this patent is extended or adjusted under 35 U.S.C. 154(b) by 605 days.

(21) Appl. No.: 12/743,647

(22) PCT Filed: Nov. 29, 2007

(86) PCT No.: PCT/EP2007/010379
§ 371 (c)(1),
(2), (4) Date: Nov. 29, 2010

(87) PCT Pub. No.: WO2009/068065
PCT Pub. Date: Jun. 4, 2009

(65) Prior Publication Data
US 2011/0162717 A1    Jul. 7, 2011

(51) Int. Cl.
B65B 1/30      (2006.01)
B65B 31/00     (2006.01)
(52) U.S. Cl.
USPC .......................................... 141/95; 141/198
(58) Field of Classification Search
USPC .................... 141/198, 206, 217, 95, 192
See application file for complete search history.

(56) References Cited

U.S. PATENT DOCUMENTS

| 5,823,235 A * | 10/1998 | Alley et al. ................... 141/197 |
| 5,975,162 A * | 11/1999 | Link, Jr. ........................ 141/231 |
| 5,983,958 A * | 11/1999 | Bergsma et al. .............. 141/59 |
| 5,988,206 A * | 11/1999 | Bare et al. ..................... 137/354 |
| 6,082,392 A * | 7/2000 | Watkins, Jr. ................... 141/231 |
| 6,164,123 A * | 12/2000 | Corkill ........................... 73/49.7 |
| 6,234,224 B1 * | 5/2001 | Schultz, Jr. .................... 141/384 |
| 6,327,898 B1 | 12/2001 | Harris |
| 6,440,317 B1 | 8/2002 | Koethe |

(Continued)

FOREIGN PATENT DOCUMENTS

| DE | 2930340 A1 | 2/1981 |
| DE | 10028157 A1 | 1/2001 |

(Continued)

OTHER PUBLICATIONS

PCT International Search Report dated Sep. 2, 2008 for related PCT International Application No. PCT/EP2007/010379 (12 pages).

(Continued)

Primary Examiner — John K Fristoe, Jr.
Assistant Examiner — Hailey K Do
(74) Attorney, Agent, or Firm — Barnes & Thornburg LLP

(57) ABSTRACT

An apparatus for testing an aircraft tank system includes a fuel supply device including a fuel reservoir, a fuel supply line for supplying fuel from the fuel reservoir to a fuel outlet of the fuel supply device, and a first isolation valve disposed in the fuel supply line. A fuel transfer line transfers fuel from the fuel outlet of the fuel supply device to the aircraft tank system and a second isolation valve is disposed in the fuel transfer line. An electronic control unit (ECU) of the apparatus is adapted to control the first isolation valve and the second isolation valve so as to interrupt the supply of fuel through the fuel supply line and the transfer of fuel through the fuel transfer line, respectively, in response to a test parameter signal provided to the electronic control unit (ECU).

5 Claims, 1 Drawing Sheet

(56) References Cited

U.S. PATENT DOCUMENTS

| | | | |
|---|---|---|---|
| 6,788,209 B2* | 9/2004 | Cothern et al. | 340/606 |
| 8,122,918 B2* | 2/2012 | Handa | 141/95 |
| 2007/0044865 A1* | 3/2007 | Ruesch et al. | 141/301 |

FOREIGN PATENT DOCUMENTS

| | | |
|---|---|---|
| DE | 10006186 C1 | 6/2001 |
| JP | 6-156599 | 6/1994 |
| RU | 415945 A2 | 1/2006 |

OTHER PUBLICATIONS

Decision on Granting for Russion counterpart Application No. 2010121240/11(030220) dated Oct. 27, 2011 (4 pages).
PCT International Search Report for PCT/EP2007/010379 issued by the EP Searching Authority on Aug. 27, 2008.
English Translation of the first Office Action titled "Notice of Reasons for Refusal," issued for the parallel Japanese Patent Application No. 2010-535230 dated Jul. 3, 2012 (4 pages).

* cited by examiner

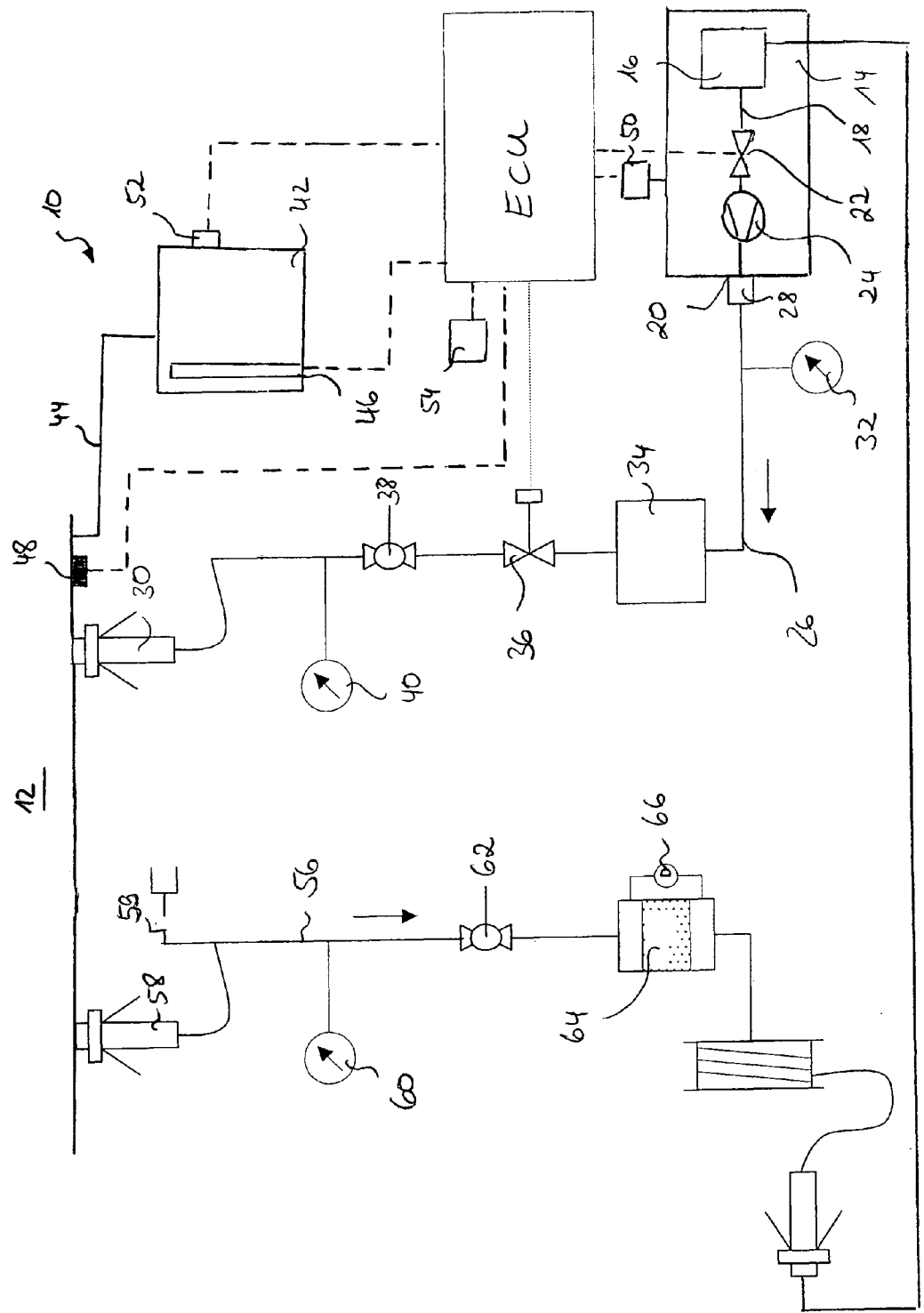

APPARATUS AND METHOD FOR TESTING AN AIRCRAFT TANK SYSTEM

CROSS-REFERENCE TO RELATED APPLICATIONS

This application is a U.S. national counterpart application of international application Serial No. PCT/EP2007/010379 filed Nov. 29, 2007.

The invention is directed to an apparatus and a method for testing an aircraft tank system.

During final assembly of an aircraft a test has to be performed on the aircraft tank system so as to ensure a proper operation of the aircraft tank system control equipment, in particular a fuel level control device. Furthermore, the test serves to discover leakages in the tank system. The aircraft tank system test involves the supply of a predefined volume of fuel from a fuel reservoir to the tank system. For safety reasons, an apparatus for testing an aircraft tank system typically comprises an emergency shut-off device which allows to interrupt the test upon occurrence of a safety critical situation, e.g. an excess pressure in one of the aircraft tanks to be tested. Additionally, the supply of fuel from the fuel reservoir usually is controlled by means of a dead man's device. The dead man's device serves to immediately interrupt the fuel supply from the fuel reservoir, if an operator fails to push a respective dead man's button, e.g. at regular time intervals or continuously, so as to generate a confirmation command for the continuation of the fuel supply from the fuel reservoir.

An aircraft tank system test might be quite time consuming and in some cases takes up to eight hours. The operation of a dead man's device for such a long time is very uncomfortable for an operator. Furthermore, there is the risk that the operator, e.g. due to a lack of concentration, mistakenly fails to push the dead man's button, so that a test is inadvertently interrupted.

The present invention is directed to the problem to provide an apparatus and a method which allow to reliably perform an aircraft tank system test and to simultaneously ensure an enhanced safety during the test.

To solve the above problem, an inventive apparatus for testing an aircraft tank system comprises a fuel supply device including a fuel reservoir and a fuel supply line which at a first end is connected to the fuel reservoir and which at a second end is connected to a fuel outlet of the fuel supply device and thus serves to supply fuel from the fuel reservoir to the fuel outlet of the fuel supply device. A first isolation valve which forms an integral part of the fuel supply device is disposed in the fuel supply line. In its open state the first isolation valve allows the supply of fuel from the fuel reservoir to the fuel outlet of the fuel supply device and in its closed state the first isolation valve interrupts the supply of fuel from the fuel reservoir to the fuel outlet of the fuel supply device. The fuel supply device might be a stationary device but preferably is a mobile device, for example a fuelling vehicle. Additionally, the fuel supply device might comprise a fuel pump which serves to deliver fuel from the fuel reservoir.

The inventive device for testing an aircraft tank system further comprises a fuel transfer line which at a first end is connected to the fuel outlet of the fuel supply device and which at a second end is connectable to the aircraft tank system and thus serves to transfer fuel from the fuel outlet of the fuel supply device to the aircraft tank system. A second isolation valve is disposed in the fuel transfer line. In its open state the second isolation valve allows the transfer of fuel from the fuel outlet of the fuel supply device to the aircraft tank system and in its closed state the second isolation valve interrupts the supply of the fuel from the fuel outlet of the fuel supply device to the aircraft tank system.

An electronic control unit of the inventive apparatus is adapted to control the first isolation valve and the second isolation valve so as to interrupt the supply of fuel through the fuel supply line and the transfer of fuel through the fuel transfer line, respectively, in response to a test parameter signal provided to the electronic control unit. In other words, the electronic control unit controls both, the first and the second isolation valve so as to close the first and the second isolation valve and thus interrupt the supply of fuel through the fuel supply line and the transfer of fuel through the fuel transfer line, respectively, if the electronic control unit receives a respective test parameter signal. The first isolation valve of the fuel supply device thus is integrated in the control circuit of the electronic control unit.

As a result, in the inventive apparatus for testing an aircraft tank system a dead man's device for controlling an interruption of the fuel supply from the fuel supply device can be omitted. The apparatus thus is comfortable to operate for an operator. Furthermore, the overall safety during performing an aircraft tank system test can be enhanced, since the electronic control unit in response to a respective test parameter signal simultaneously controls the first and the second isolation valve so as to intermediately interrupt the supply of fuel through the fuel supply line and the transfer of fuel through the fuel transfer line, respectively.

The electronic control unit of the inventive apparatus might further be adapted to control the fuel pump of the fuel supply device so as to stop the delivery of fuel from the fuel reservoir in response to a respective test parameter signal provided to the electronic control unit. Alternatively, it is, however, also possible not to integrate the fuel pump in the control circuit of the electronic control unit. If the first isolation valve is closed in response to a respective command from the electronic control unit while the fuel pump operation continues, the operating modus of the fuel pump changes to an idling operation modus.

Preferably, for enhanced safety, at least one of the first and the second isolation valve of the inventive apparatus for testing an aircraft tank system is a pneumatically operated valve.

In a preferred embodiment the inventive apparatus further comprises a pressure sensor for sensing a pressure within the aircraft tank system and for providing a test parameter signal indicative of the pressure within the aircraft tank system. Preferably, the pressure sensor is adapted to be removably connected to a water drain valve provided on the aircraft tank system. For example, the pressure sensor might be adapted to be removably disposed within a housing of a water drain valve provided on the aircraft tank system. Alternatively, the pressure sensor can be connected to an outer part of the water drain valve. The water drain valve usually is disposed at the bottom of the aircraft tank system and accessible from outside the aircraft to allow the removal of condensation water from the aircraft tank system. By providing a pressure sensor which might be inserted into the housing of the water drain valve after simply removing the water drain valve body, the pressure sensor can easily be installed from outside the aircraft. An installation of the pressure sensor inside the aircraft tank system thus can be omitted. Since the water drain valve usually is disposed at the lowest point of the tank system, positioning the sensor within the housing of this valve, also allows a particular reliable and exact measuring of the pressure within the tank system.

The inventive apparatus might comprise a plurality of pressure sensors which serve to sense the pressure within the individual tanks of the aircraft tank system, i.e. the wing tanks, the center tank and the auxiliary center tanks of the aircraft. The pressure sensors which might be disposed in housings of water drain valves of the individual tanks provide test parameter signals indicative of the pressure within the individual tanks of the aircraft tank system to the electronic control unit.

The electronic control unit might be adapted to control the first isolation valve and the second isolation valve so as to interrupt the supply of fuel through the fuel supply line and the transfer of fuel through the fuel transfer line, respectively, if the pressure within the aircraft tank system sensed by means of the pressure sensor(s) exceeds a predetermined limit. The inventive apparatus then reliably ensures that the pressure within the aircraft tank system during fuelling the tank system upon performing an aircraft tank system test does not exceed the predetermined limit. As a result, the overall safety during performing the test can be significantly enhanced. Furthermore, damages to the tank system and the aircraft due to excess fuel pressure within the aircraft tank system can be avoided.

The inventive apparatus might further comprise an overflow reservoir which might be connected to the aircraft tank system during performing the aircraft tank system test for receiving overflowing fuel from the aircraft tank system. Typically, an aircraft tank system control equipment comprises a fuel level control device which might be adapted to automatically interrupt the supply of fuel to the aircraft tank system, if a fuel level sensing device for sensing the fuel level in the aircraft tank system indicates that the aircraft tanks are full. During performing an aircraft tank system test the proper operation of the fuel level control device has to be tested. In case of a malfunction of the fuel level control device, i.e. in case the supply of fuel to the aircraft tank system is not interrupted, although the aircraft tanks are already full, the overflow reservoir receives fuel overflowing from the aircraft tank system. Furthermore, an overflow test can be performed, during which the supply of fuel to the aircraft tank system is intentionally continued, although the aircraft tanks are already full.

In the inventive apparatus for testing an aircraft tank system a level sensor might be provided for sensing a fuel level in the overflow reservoir and for providing a test parameter signal indicative of the fuel level in the overflow reservoir. Preferably, a plurality of overflow reservoirs is provided for receiving overflowing fuel from the individual tanks of the aircraft tank system. Each overflow reservoir might be provided with a level sensor for sensing the fuel level in the overflow reservoir and for providing a test parameter signal indicative of the fuel level in the overflow reservoir.

Preferably the electronic control unit of the inventive apparatus is adapted to control the first isolation valve and the second isolation valve so as to interrupt the supply of fuel through the fuel supply line and the transfer of fuel through the fuel transfer line, respectively, if the fuel level in the overflow reservoir sensed by means of the level sensor exceeds a predetermined limit. In other words, in the inventive apparatus the supply of fuel through the fuel supply line and the transfer of fuel through the fuel transfer line is interrupted, if the overflow reservoir(s) is/are full.

Preferably, the inventive apparatus further comprises at least one manually operable emergency shut-off button which upon actuation provides a test parameter signal indicative of a control request of an operator. The apparatus might be provided with a plurality of manually operable emergency shut-off buttons associated to the fuel supply device, a stationary or mobile test station comprising the fuel transfer line and the second isolation valve and each of the overflow reservoirs.

The electronic control unit of the inventive apparatus might be adapted to control the first isolation valve and the second isolation valve so as to interrupt the supply of fuel through the fuel supply line and the transfer of fuel through the fuel transfer line, respectively, in response to the test parameter signal provided by the emergency shut-off button. In other words, the electronic control unit controls the first and the second isolation valve so as to interrupt the supply of fuel through the fuel supply line and the transfer of fuel through the fuel transfer line, respectively, if an operator manually pushes an emergency shut-off button provided on the inventive apparatus.

An inventive method for testing an aircraft tank system comprises the steps of supplying fuel from a fuel reservoir to a fuel outlet of a fuel supply device via a fuel supply line and transferring fuel from the fuel outlet of the fuel supply device to the aircraft tank system via a fuel transfer line. A first isolation valve disposed in the fuel supply line and a second isolation valve disposed in the fuel transfer line are controlled by means of an electronic control unit so as to interrupt the supply of fuel through the fuel supply line and the transfer of fuel through the fuel transfer line, respectively, in response to a test parameter signal provided to the electronic control unit.

Preferably the inventive method further comprises the steps of sensing a pressure within the aircraft tank system and providing a test parameter signal indicative of the pressure within the aircraft tank system by means of a pressure sensor. The first isolation valve and the second isolation valve preferably are controlled by means of the electronic control unit so as to interrupt the supply of fuel through the fuel supply line and the transfer of fuel through the fuel transfer line, respectively, if the pressure within the aircraft tank system sensed by means of the pressure sensor exceeds a predetermined limit.

The inventive method for testing an aircraft tank system might further comprise the steps of sensing a fuel level in an overflow reservoir for receiving overflowing fuel from the aircraft tank system and providing a test parameter signal indicative of the fuel level in the overflow reservoir by means of level sensor. The first isolation valve and the second isolation valve may be controlled by means of the electronic control unit so as to interrupt the supply of fuel through the fuel supply line and the transfer of fuel through the fuel transfer line, respectively, if the fuel level within the overflow reservoir sensed by means of the level sensor exceeds a predetermined limit.

Preferably, the inventive method further comprises the steps of providing at least one manually operable emergency shut-off button which upon actuation provides a test parameter signal indicative of a control request of an operator. The first isolation valve and the second isolation valve may be controlled by means of the electronic control unit so as to interrupt the supply of fuel through the fuel supply line and the transfer of fuel through the fuel transfer line, respectively, in response to the test parameter signal provided by the emergency shut-off button.

The present invention now is explained in detail with reference to the schematic drawing showing a preferred embodiment of an inventive apparatus for testing an aircraft tank system.

An apparatus 10 for testing an aircraft tank system 12 comprises a fuel supply device 14 in the form of a fuelling vehicle which includes a fuel reservoir 16. The fuel supply reservoir 16 is connected to a first end of a fuel supply line 18.

A second end of the fuel supply line 18 is connected to a fuel outlet 20 of the fuel supply device 14.

A first isolation valve 22 is disposed in the fuel supply line 18 which in its closed state interrupts the supply of fuel from the fuel reservoir 16 to the fuel outlet 20 of the fuel supply device 14. To the contrary, in its open state the first isolation valve 22 allows fuel to be supplied from the fuel reservoir 16 to the fuel outlet 20 of the fuel supply device 14. A fuel pump 24 disposed in the fuel supply line 18 downstream of the first isolation valve 22 serves to deliver fuel from the fuel reservoir 16.

The fuel outlet 20 of the fuel supply device 14 is connected to a first end of a fuel transfer line 26 via an appropriate coupling member 28. For performing an aircraft tank system test, a second end of the fuel transfer line 26 is connected to the aircraft tank system 12 via a coupling member 30. A first pressure gauge 32 is disposed in the fuel transfer line 26 for sensing the pressure within the fuel transfer line 26. Downstream of the first pressure gauge 32 a counting device 34 is disposed in the fuel transfer line 26 which serves to measure the mass, the density and the temperature of the fuel flowing through the fuel transfer line 26.

A second isolation valve 36 is disposed in the fuel transfer line 26 downstream of the counting device 34. The second isolation valve 32, like the first isolation valve 22, is a pneumatically operated valve. In its closed state the second isolation valve 36 interrupts the supply of fuel from the fuel outlet 20 of the fuel supply device 14 to the aircraft tank system 12, whereas the second isolation valve 36 in its open state allows fuel to be supplied from the fuel outlet 20 of the fuel supply device 14 to the aircraft tank system 12.

A fuel supply valve 38 is disposed in the fuel transfer line 26 downstream of the second isolation valve 36. The fuel supply valve serves to regulate the flow of fuel through the fuel transfer line 26. A second pressure gauge 40 is disposed in the fuel transfer line 26 downstream of the fuel supply valve 38 for sensing the pressure within the fuel transfer line 26 downstream of the fuel supply valve 38.

An overflow reservoir 42 is connected to the aircraft tank system 12 via an overflow line 44 which serves to receive overflowing fuel from the aircraft tank system in case excess fuel is supplied to the aircraft tank system 12, although the aircraft tanks 12 are already full. A level sensor 46 is provided in the overflow reservoir 42 to sense the fuel level in the overflow reservoir 42.

A pressure sensor 48 serves to measure the pressure within the aircraft tank system 12. The pressure sensor 48 is removably disposed within a housing of a water drain valve provided on the aircraft tank system 12. The water drain valve is disposed at a bottom of the aircraft tank system 12 and accessible from outside the aircraft. The pressure sensor 48 thus can be inserted into the housing of the water drain valve after removing the water drain valve body.

Furthermore, emergency shut-off buttons 50, 52, 54 are provided on the fuel supply device 14, the overflow reservoir 42 and a mobile test station comprising the fuel transfer line 26, the first and the second pressure gauges 32, 40, the counting device 34, the second isolation valve 36 and the fuel supply valve 38.

The emergency shut-off buttons 50, 52, 54 each provide a test parameter signal to an electronic control unit ECU which indicates a control request, i.e. a shut-off request of an operator. Furthermore, test parameters signals indicative of the fuel level in the overflow reservoir are provided to the electronic control unit ECU by the fuel level sensor 46. Finally, the electronic control unit ECU receives test parameter signals indicative of the pressure within the aircraft tank system 12 from the pressure sensor 48.

The apparatus 10 for testing an aircraft tank system 12 further comprises a fuel discharge line 56 which is connected to the aircraft tank system 12 by means of a coupling member 58. The fuel discharge line 56 is connected to a vent line 59 which can be connected to the coupling member 30 at the second end of the fuel supply line 18. This arrangement allows to circulate fuel from the fuel supply line 18 directly to the fuel discharge line 56 without an aircraft tank system 12 being connected between the fuel supply line 18 and the fuel discharge line 56, e.g. to purge of the fuel supply line 18. A third pressure gauge 60 is disposed in the fuel discharge line 56 for measuring the fuel pressure within the fuel discharge line 56.

The discharge of fuel from the aircraft tank system 12 via the fuel discharge line 56 is controlled by means of a fuel discharge valve 62. In its closed state the fuel discharge valve 62 interrupts the discharge of fuel from the aircraft tank system 12 through the fuel discharge line 56, whereas the fuel discharge valve 62 in its open state allows fuel to be discharged from the aircraft tank system 12 through the fuel discharge line 56. The fuel discharge line 56 is connected to the fuel reservoir 16 of the fuel supply device 14. This permits defuelling of the aircraft tank system independent of the pump 24 of the fuel supply device 14. The fuel discharged via the fuel discharge line 56 after performing an aircraft tank system test thus can be reused for further tests.

A filter 64 is disposed in the fuel discharge line 56 downstream of the fuel discharge valve 62. The filter 64 is provided with a differential pressure sensing device 66 so as to detect choking or other malfunctions of the filter 64. The filter 64 serves to prevent particulate impurities within the fuel discharged from the aircraft tank system 12 to be introduced into the fuel reservoir 16 of the fuel supply device 14.

For performing an aircraft tank system test the second end of the fuel transfer line 26 is connected to the aircraft tank system 12 via the coupling member 30. The fuel supply valve 38 is manually brought into its open state to allow the supply of fuel from the fuel supply device 14 to the aircraft tank system 12. The pump of the fuel supply device 14 then is operated and fuel is delivered from the fuel reservoir 16 to the aircraft tank system 12.

During fuelling the aircraft tank system 12 the pressure within the aircraft tank system 12 is continuously sensed by means of the pressure sensor 48. Furthermore, the level sensor 46 continuously senses the fuel level in the overflow reservoir 42.

In case signals provided from the pressure sensor 48 to the electronic control unit ECU indicate that the pressure within the aircraft tank system 12 exceeds a predetermined limit, the electronic control unit ECU controls the first isolation valve 22 disposed in the fuel supply line 18 and the second isolation valve 36 disposed in the fuel transfer line 26 so as to intermediately interrupt the supply of fuel through the fuel supply line 18 and the transfer of fuel through the fuel transfer line 26, respectively. The supply of fuel from the fuel reservoir 16 of the fuel supply device 18 to the aircraft tank system 12 thus is reliably interrupted.

Similarly, the electronic control unit ECU controls the first isolation valve 22 and the second isolation valve 36 so as to interrupt the supply of fuel through the fuel supply line 18 and the transfer of fuel through the fuel transfer line 26, respectively, if a signal provided by the level sensor 46 to the electronic control unit ECU indicates that the overflow reservoir 42 is full.

Finally, the electronic control unit ECU controls the first isolation valve 22 and the second isolation valve 36 so as to interrupt the supply of fuel through the fuel supply line 18 and the transfer of fuel through the fuel transfer line 26, respectively, if any one of the emergency shut-off buttons 50, 52, 54 is manually actuated by an operator.

For defuelling the aircraft tank system 12, the fuel discharge line 56 is connected to the aircraft tank system 12 via the coupling member 58. Thereafter, the fuel discharge valve 62 is manually brought into its open state so that fuel can be discharged from the aircraft tank system 12 via the fuel discharge line 56 and reintroduced into the fuel reservoir 16 of the fuel supply device 14.

The invention claimed is:

1. Apparatus for testing an aircraft tank system comprising:
    a fuel supply device including a fuel reservoir, a fuel supply line for
    supplying fuel from the fuel reservoir to a fuel outlet of the fuel supply device, and a first isolation valve disposed in the fuel supply line,
    a fuel transfer line for transferring fuel from the fuel outlet of the fuel supply device to the aircraft tank system,
    a second isolation valve disposed in the fuel transfer line,
    a pressure sensor to sense pressure within the aircraft tank system and produce a test parameter signal indicative of the pressure within the aircraft tank system, and
    an electronic control unit which is adapted to control the first isolation valve and the second isolation valve so as to interrupt the supply of fuel through the fuel supply line and the transfer of fuel through the fuel transfer line, respectively, in response to the test parameter signal provided to the electronic control unit if the pressure within the aircraft tank system sensed by the pressure sensor exceeds a predetermined limit, and
    an overflow reservoir for receiving overflowing fuel from the aircraft tank system and a level sensor for sensing a fuel level within the overflow reservoir and for providing a test parameter signal indicative of the fuel level in the overflow reservoir, wherein the electronic control unit is adapted to control the first isolation valve and the second isolation valve so as to interrupt the supply of fuel through the fuel supply line and the transfer of fuel through the fuel transfer line, respectively, if the fuel level within the overflow reservoir sensed by means of the level sensor exceeds a predetermined limit.

2. Apparatus according to claim 1, wherein at least one of the first and the second isolation valve is a pneumatically operated valve.

3. Apparatus according to claim 1, further comprising at least one manually operable emergency shut-off button which upon actuation provides a test parameter signal indicative of a control request of an operator, wherein the electronic control unit is adapted to control the first isolation valve and the second isolation valve so as to interrupt the supply of fuel through the fuel supply line and the transfer of fuel through the fuel transfer line, respectively, in response to the test parameter signal provided by the emergency shut-off button.

4. A method for testing an aircraft tank system comprising:
    supplying fuel from a fuel reservoir to a fuel outlet of a fuel supply device via a fuel supply line,
    transferring fuel from the fuel outlet of the fuel supply device to the aircraft tank system via a fuel transfer line,
    sensing pressure within the aircraft tank system and providing a test parameter signal indicative of the pressure within the aircraft tank system, and
    controlling a first isolation valve disposed in the fuel supply line and a second isolation valve disposed in the fuel transfer line by means of an electronic control unit so as to interrupt the supply of fuel through the fuel supply line and the transfer of fuel through the fuel transfer line, respectively, in response to the test parameter signal provided to the electronic control unit if the pressure within the aircraft tank system sensed by the pressure sensor exceeds a predetermined limit,
    sensing a fuel level in an overflow reservoir for receiving overflowing fuel from the aircraft tank system and providing a test parameter signal indicative of the fuel level in the overflow reservoir by means of a level sensor, and
    controlling the first isolation valve and the second isolation valve by means of the electronic control unit so as to interrupt the supply of fuel through the fuel supply line and the transfer of fuel through the fuel transfer line, respectively, if the fuel level within the overflow reservoir sensed by means of the level sensor exceeds a predetermined limit.

5. A method according to claim 4, further comprising:
    providing at least one manually operable emergency shut-off button which upon actuation provides a test parameter signal indicative of a control request of an operator, and
    controlling the first isolation valve and the second isolation valve by means of the electronic control unit so as to interrupt the supply of fuel through the fuel supply line and the transfer of fuel through the fuel transfer line, respectively, in response to the test parameter signal provided by the emergency shut-off button.

* * * * *